(12) United States Patent
Provost et al.

(10) Patent No.: US 8,616,063 B2
(45) Date of Patent: Dec. 31, 2013

(54) METHOD AND APPARATUS FOR THERMAL CONTROL OF A MULTIPLE CHAMBER TEST SYSTEM

(75) Inventors: James A. Provost, Westminster, CO (US); Matthew Giaraffa, Denver, CO (US); Wendell K R Hutchings, Aurora, CO (US)

(73) Assignee: Qualmark Corporation, Denver, CO (US)

( * ) Notice: Subject to any disclaimer, the term of this patent is extended or adjusted under 35 U.S.C. 154(b) by 0 days.

(21) Appl. No.: 13/209,136

(22) Filed: Aug. 12, 2011

(65) Prior Publication Data

US 2012/0079883 A1    Apr. 5, 2012

Related U.S. Application Data

(63) Continuation-in-part of application No. 12/896,254, filed on Oct. 1, 2010, now Pat. No. 8,485,039.

(51) Int. Cl.
*G01N 7/06* (2006.01)
*G01N 17/00* (2006.01)

(52) U.S. Cl.
USPC ........................................... 73/663; 73/865.6

(58) Field of Classification Search
USPC ........... 73/662, 663, 664, 665, 666, 667, 668, 73/865.6
See application file for complete search history.

(56) References Cited

U.S. PATENT DOCUMENTS

| | | | |
|---|---|---|---|
| 2,450,939 A | 10/1948 | Cor | |
| 3,284,148 A | 11/1966 | Ramniceanu | |
| 4,729,246 A * | 3/1988 | Melgaard et al. | 73/865.6 |
| 4,854,726 A * | 8/1989 | Lesley et al. | 374/45 |
| 5,513,538 A | 5/1996 | Baker et al. | |
| 5,517,857 A | 5/1996 | Hobbs | |
| 5,637,812 A * | 6/1997 | Baker et al. | 73/865.6 |
| 5,675,098 A | 10/1997 | Hobbs | |
| 6,062,086 A | 5/2000 | Hess | |
| 6,112,596 A | 9/2000 | Hess | |
| 6,220,100 B1 | 4/2001 | Felkins et al. | |
| 6,434,954 B1 | 8/2002 | Hess et al. | |
| 6,446,508 B1 * | 9/2002 | Peterson et al. | 73/571 |
| 6,863,123 B2 * | 3/2005 | Wang et al. | 165/263 |
| 7,299,698 B2 | 11/2007 | Hobbs | |
| 8,100,017 B1 * | 1/2012 | Blick et al. | 73/666 |
| 2003/0066639 A1 | 4/2003 | Wang et al. | |

(Continued)

OTHER PUBLICATIONS

Halt/Hass Chamber Summary Specifications, available at http://www.hanseenv.com/content/category/6/77/70/, Hanse Environmental Inc., printed on Oct. 4, 2010, 3 pages.

(Continued)

*Primary Examiner* — Peter Macchiarolo
*Assistant Examiner* — Rose M Miller
(74) *Attorney, Agent, or Firm* — Sheridan Ross P.C.

(57) ABSTRACT

A multiple chamber test system is provided. The multiple chamber test system includes a plurality of test chambers that each include a vibration table. In addition, each of the test chambers is provided with thermally controlled air from a common source. An output plenum for providing thermally controlled air to the test chambers may include a flow control device, to provide the same or similar thermal conditions in each of the test chambers. Where pneumatic actuators are used to impart movement to the vibration tables, the exhaust air from the actuators can be prevented from mixing with the thermally controlled chamber air.

20 Claims, 11 Drawing Sheets

(56) References Cited

U.S. PATENT DOCUMENTS

| | | |
|---|---|---|
| 2004/0025590 A1 | 2/2004 | Schaad et al. |
| 2007/0269888 A1 | 11/2007 | Houtzager et al. |
| 2008/0251048 A1 | 10/2008 | Nichols et al. |

OTHER PUBLICATIONS

Halt/Hass Systems, Test Equipment for Highly Accelerated Life Test and Stress Screen Applications, Envirotronics, 12 pages.

Chart Industries Test Chambers, Chamber User's Manual, 2005, Chart Industries, Inc., 42 pages.

Halt/Hass-Prüfgerät „Sigma", Halt/Hass Test Cabinet „Sigma", Schunk Group, Weiss Technik, Weiss Umwelttechnik GmbH, 2 pages.

Provost et al., U.S. Appl. No. 12/896,254, Entitled "Method and Apparatus for Thermal Control of a Multiple Chamber Test System", filed Oct. 1, 2010, 29 pages.

Provost et al., U.S. Appl. No. 12/896,245, Entitled "Test System With Vibration Table", filed Oct. 1, 2010, 25 pages.

International Search Report and Written Opinion issued in related PCT Patent Application PCT/US11/4416, mailed May 14, 2012, 24 pages.

Response to Written Opinion filed in related PCT Patent Application PCT/US11/4416, dated Aug. 14, 2012, 72 pages.

Select file history from related U.S. Appl. No. 12/896,254, dated Oct. 4, 2013 through Dec. 26, 2012, 39 pages.

Office Action issued in related U.S. Appl. No. 12/896,245, dated Dec. 19, 2012, 13 pages.

International Preliminary Report on Patentability for PCT/US11/544416, mailed Apr. 4, 2013, 16 pages.

Notice of Allowance for U.S. Appl. No. 12/896,254, mailed Mar. 18, 2013, 17 pages.

\* cited by examiner

METHOD AND APPARATUS FOR THERMAL CONTROL OF A MULTIPLE CHAMBER TEST SYSTEM

CROSS-REFERENCE TO RELATED APPLICATIONS

This application is a continuation-in-part of U.S. patent application Ser. No. 12/896,254, filed Oct. 1, 2010, entitled "METHOD AND APPARATUS FOR THERMAL CONTROL OF A MULTIPLE CHAMBER TEST SYSTEM", and is related to U.S. patent application Ser. No. 12/896,245, filed Oct. 1, 2010, entitled "TEST SYSTEM WITH VIBRATION TABLE", the entire disclosures of which are hereby incorporated herein by reference.

FIELD

This invention relates generally to air circulation systems and methods for thermal control of a multiple chamber test system.

BACKGROUND

Systems for performing highly accelerated life testing (HALT), highly accelerated stress screening (HASS), and highly accelerated stress audits (HASA) are available to test the reliability and durability of manufactured products. More particularly, the durability of products can be tested using HALT systems and procedures. Products can also be tested for defects before they are distributed to consumers using HASS procedures, where all of the products are tested, or HASA procedures, in which samples taken from a production run are tested. In general, such testing includes subjecting devices under test to vibration energy and/or temperature cycling. Such stresses may be introduced to a device under test by mounting the device under test to a shaker or vibration table that is located inside an environmentally controlled test chamber.

Particularly in connection with HASS and HASA programs, including HASS and HASA programs that utilize multiaxis random vibration combined with rapid (greater than 40 C per minute) changes, it is desirable to provide systems that are capable of efficiently testing a large number of devices. To this end, test chambers are available that allow vibration tables to be accessed from multiple sides, facilitating the placement of devices under test in the test chamber, and the interconnection of the devices under test to the vibration table. However, particularly with vibration tables having a relatively large area, there is often at least a portion of the vibration table surface that is difficult to access, and that is therefore rarely if ever used to support a device under test. Accordingly, the maximum available throughput of the test chamber is not utilized. The result is that the cost per unit tested is higher than it would otherwise be. In addition, where a relatively large vibration table surface is provided and/or where at least a portion of the vibration table surface is unutilized or underutilized, the volume of the test chamber is larger than would otherwise be required. This results in a system that uses more energy to effect thermal cycling of the chamber than might otherwise be required.

A single table with a relatively large area can also be inconvenient, particularly where a number of devices under test are to be connected to the table.

SUMMARY

Embodiments of the present invention are directed to solving these and other problems and disadvantages of the prior art. In accordance with embodiments of the present invention, a multiple chamber or compartment test system is provided. More particularly, multiple test chambers or volumes, each associated with a vibration table, are provided within a single cabinet or enclosure, for testing multiple devices or products, referred to herein as devices under test, simultaneously. Each test chamber within the enclosure is provided with temperature controlled air from a plenum. In addition, for embodiments in which air powered actuators or hammers are employed, a table air enclosure can be included to prevent the actuator exhaust air from mixing with the temperature controlled chamber air.

In order to provide the same or similar thermal conditions in each of the multiple chambers, various features have been developed and incorporated into the plenum design. For example, in an intake plenum portion of the air handling system, heating and/or cooling elements are disposed. Air is drawn through the intake plenum, across the heating and/or cooling elements, by one or more fans. In accordance with embodiments of the present invention, the fan is of a tangential blower type design. Moreover, the fan can have a width that is equal or about equal to the width of the plenum assembly or a portion of the plenum assembly. The air output by the fan is passed to an outlet portion of the plenum assembly or outlet plenum. Where the plenum assembly provides air to multiple test chambers that are stacked vertically, the outlet plenum can be tapered, such that the area of the plenum decreases with increasing distance from the fan. In accordance with still other embodiments of the present invention, one or more flow control devices can be included. More particularly, a flow control device or element can be disposed within or in communication with the outlet plenum, to facilitate a balanced distribution of air to the multiple test chambers. Moreover, a flow control device can comprise a diverter, a damper, a valve, or other structure or device for controlling a rate of air flow. In accordance with other embodiments, the effect of a flow control device can be varied, to control the air flow from the outlet plenum to a test chamber associated with the flow control device. In accordance with still other embodiments, where pneumatic actuators are employed to operate the vibration tables, enclosures can be provided to keep the exhaust from the pneumatic actuators separate from the temperature controlled chamber air that occupies the test area of the chambers.

In accordance with embodiments of the present invention, the multiple test chambers can be disposed in columns of one or more test chambers. In accordance with such embodiments, each column can be associated with dedicated air circulation system components. For example, each column of test chambers can be associated with one or more heating elements, one or more cooling elements, one or more fans, and an outlet plenum. Moreover, provided air circulation system components associated with particular test chambers or columns of test chambers can be controlled independently of the air circulation system components of other test chambers or columns of test chambers. In accordance with still other embodiments, flow control devices associated with individual test chambers or sets of test chambers can be separately controlled.

Methods in accordance with embodiments of the present invention include distributing air to the chambers of a multiple chamber system equally. This can include controlling the air distributed to the different chambers such that the rate of air blown into each chamber is equal or substantially equal. In accordance with still other embodiments, the establishment or maintenance of thermal uniformity can include providing different chambers with air from a plenum at different rates. In accordance with further embodiments, the method can include varying the rate at which air is supplied to one or more of the test chambers. In addition, air from sources other than a thermally controlled plenum can be segregated, to prevent that air from influencing the thermal conditions within the test area of the multiple chambers.

In accordance with further embodiments of the present invention, methods can include controlling the distribution of air to different chambers of a multiple test chamber system independently or in sets. For instance, in connection with multiple test chamber systems including multiple columns of test chambers, heating elements, cooling elements, or fans can be controlled separately for each column. As a further example, flow control devices, including but not limited to active flow control devices associated with individual test chambers can be controlled separately. For example, a flow control device for a test chamber can be operated independently of flow control devices for other test chambers in the same or different columns of test chambers.

Additional features and advantages of embodiments of the present invention will become more readily apparent from the following discussion, particularly when taken together with the accompanying drawings.

DETAILED DESCRIPTION

Figure 1:
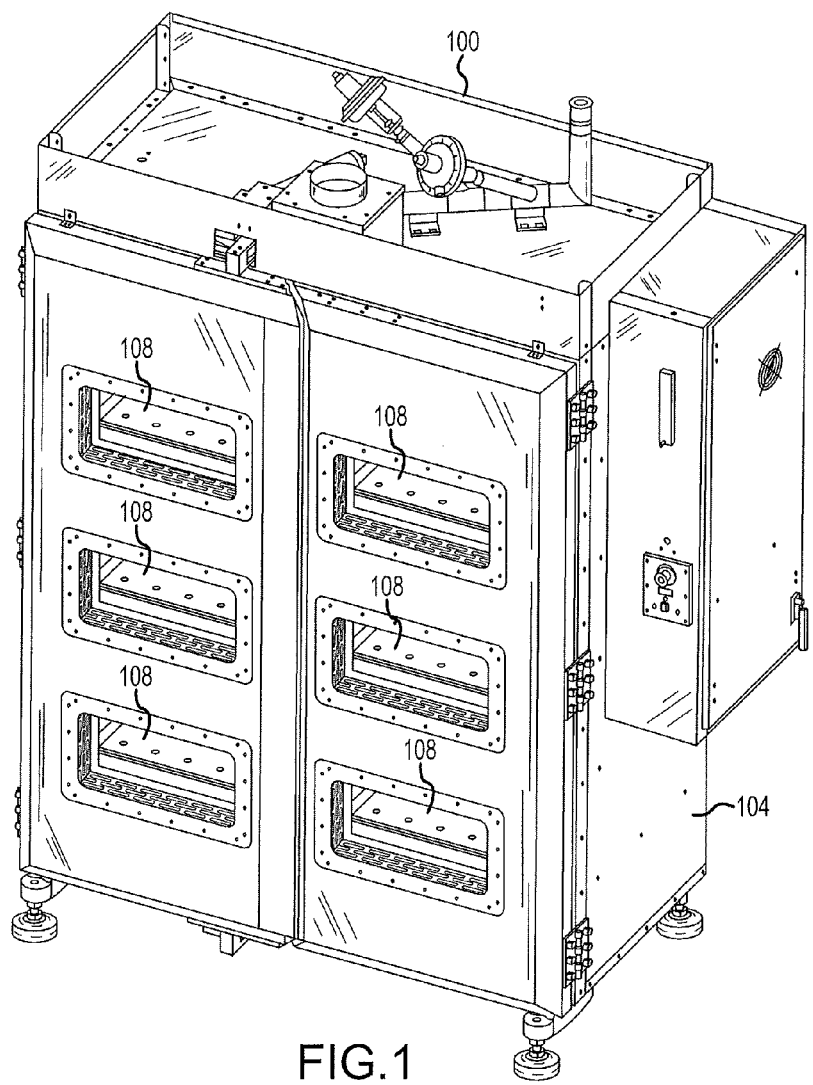
FIG. 1 is a front perspective view of a multiple chamber test system in accordance with embodiments of the present invention.

FIG. 1 is a front perspective view of a multiple chamber test system 100 in accordance with embodiments of the present invention. In general, the multiple chamber test system 100 includes a cabinet or enclosure 104 that contains multiple individual test chambers 108. In the example shown, six test chambers 108 are included in the system 100. However, embodiments of the present invention are not limited to any particular number of test chambers 108. In accordance with embodiments of the present invention, each individual test chamber 108 includes a vibration table, and a thermally controlled environment suitable for performing reliability, durability, and/or defect testing of products.

Figure 2:
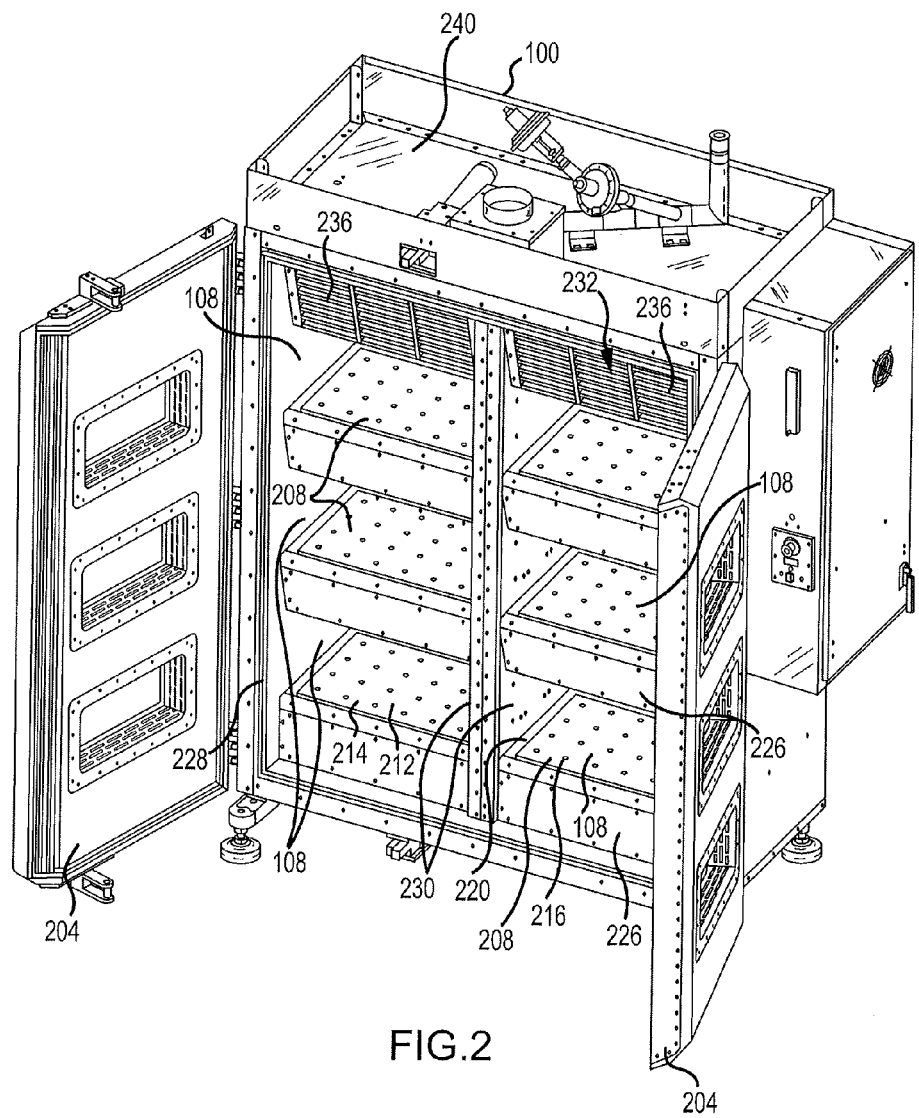
FIG. 2 is a front perspective view of a multiple chamber test system in accordance with embodiments of the present invention, with the front doors open.

FIG. 2 illustrates the multiple chamber test system 100 of FIG. 1, with the access doors 204 opened, to provide access to each of the test chambers 108. With the doors 204 open, some of the components of the test chambers 108 can be seen. In particular, each test chamber 108 includes a shaker or vibration table assembly 208. Each vibration table assembly 208 generally includes a table 212 having a mounting side or surface 214 that includes mounting points 216 to which devices under test can be connected, either directly or through a fixture. In addition, each vibration table assembly 208 can be associated with a skirt 220 that, together with a vibration table shroud 224, and the side walls 228 and center walls 230 defining the lateral extent of the test chambers 108, enclose the actuators and supports (not shown in FIG. 2) associated with the vibration table assembly 208. This allows the climate controlled air in the test chamber 108 volume to be maintained separately from the actuators. For example, the vibration table assembly 208 actuators can thus be contained in an environment that is separated from the chamber air provided to the test chambers 108 in which devices under test are placed and are subjected to thermal cycling and/or thermal control. As a further example, for systems 100 in which pneumatic actuators are used, by enclosing the actuators associated with each table assembly 208 exhaust air from the pneumatic actuators associated with the vibration table assemblies 208 can be prevented from mixing with the chamber air provided to the test chambers 108.

FIG. 2 also shows components associated with the air circulation system 232 of the multiple chamber test system 100. In general, the air circulation system 232 includes at least one air intake 236. Moreover, for each test chamber 108 included in a system 100, the volume associated with a test chamber 108 is in communication with at least one intake 236. In the example system 100 shown in FIG. 2, there is one air intake 236 for each column of three test chambers 108. The air circulation system 232 additionally includes an intake plenum 240. The intake plenum 240 receives air through the air intake or intakes 236, and can house or otherwise be in communication with an air circulation fan 304 (see FIG. 3).

Figure 3:
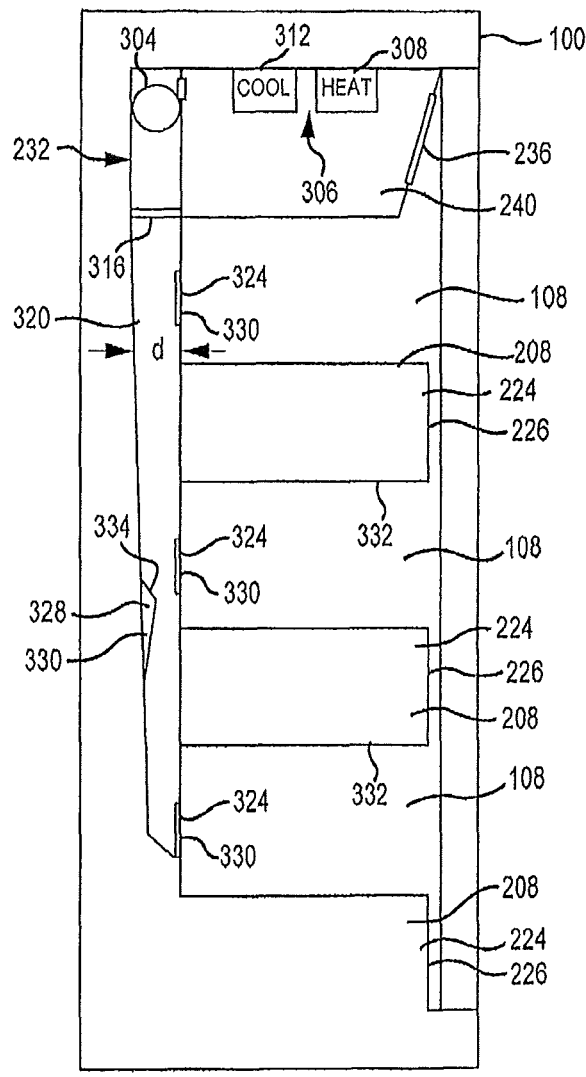
FIG. 3 is a cross-section side elevation view of portions of a multiple chamber test system depicting some of the features of an air circulation system in accordance with embodiments of the present invention.

FIG. 3 is a cross-section of a system 100 in accordance with embodiments of the present invention, and in particular shows features of the air circulation system 232. In general, temperature controlled chamber air is circulated through the multiple test chambers 108 by the air circulation system 232. In operation, air is drawn into the intake plenum 240, through an air intake 236, by the air circulation system fan 304. The fan 304 may comprise a tangential blower. In addition, multiple fans 304 may be provided. In accordance with embodiments of the present invention, the intake plenum 240 houses thermal control elements 306. These thermal control elements 306 can include a heating device 308 and/or a cooling device 312. As an example, the heating device 308 can comprise electrically powered resistance heaters. The cooling device 312 can comprise, for example, a liquid nitrogen cooling system. Accordingly, air drawn into the intake plenum 240 can be heated or cooled as needed to provide supply air at a desired temperature to the test chambers 108 of the system 100. As can be appreciated by one of skill in the art, the operation of certain types of thermal control elements 306 can cause increases or decreases in the volume of the chamber air in the air circulation system 232. Therefore, the air circulation system 232 can include provisions for admitting or releasing air as required to maintain a constant or nearly constant air pressure with the cabinet 104.

The air drawn through the intake plenum 240 by the fan 304 is passed through a fan outlet 316 to an air distribution or outlet plenum 320. As can be seen in the figure, the outlet plenum 320 in the illustrated example has a depth d that generally decreases with distance from the fan outlet 316. In addition, an air outlet 324 is provided for each test chamber 108. The decrease in the depth d of the outlet plenum 320 assists in the provision of equal amounts of temperature controlled air to the test chambers 108. In addition, the outlet plenum 320 can include other features to assist in equalizing the amount of air provided to each test chamber 108. For example, one or more diverters 328 can be provided to control the flow of air in the outlet plenum 320.

The air circulation system 232 can include one or more flow control devices 330. For example, a flow control device 330 comprising one or more diverters 328 can be included. A diverter 328 can include a surface or volume that forms a constriction in the outlet plenum 320. Moreover, a diverter 328 can be located downstream of an air outlet 324. A diverter 328 comprising a constriction creates an area of elevated pressure that promotes a flow of air through the air outlet 324 immediately upstream of the diverter 328. Accordingly, a diverter 328 can be used to balance the flow of air to the test chambers 108. In accordance with still other embodiments, a diverter 328 can comprise a constriction with a movable surface or surfaces 334, to allow the size of the constriction in the outlet plenum 320 to be varied, to vary the flow of air through a nearby air outlet 324. Alternatively or in addition, the air outlet 324 may comprise a flow control device 330 in the form of a valve or grille that can be adjusted to control the flow of air through the air outlet 324.

In accordance with other embodiments of the present invention, the outlet plenum 320 can have a depth that remains constant along the length of the outlet plenum 320. In accordance with such embodiments, the flow of air from the outlet plenum 320 into individual test chambers 108 can be controlled by diverters, dampers, valves, or other flow control devices 330 placed between the fan or fans 304 and one or more of the test chambers 108. For example, a flow control device 330 associated with an outlet 324 that is closest to the fan 304 may be relatively more restrictive than a flow control device 330 associated with an outlet 324 that is downstream from the first outlet. For instance, an area of an outlet 324 relatively near to the fan 304 may have an area that is less than the area of an outlet 324 relatively far from the fan 304. By thus differentially configuring the flow control devices 330, flow to individual chambers 108 can be equalized, even though the outlets 324 supplying those test chambers 108 are at different locations relative to the fan 304. In accordance with still other embodiments, flow control devices 330 can comprise variable flow control devices 330. Moreover, the variable flow control devices 330 may be under active control. For example, an active flow control device 330 may comprise an active diverter 328, with a surface 334 that is movable relative to a nearby outlet 324. In particular, by moving the surface, the area of the outlet plenum 232 can be increased or decreased. This in turn allows flow through one or more outlets 324 to be adjusted. As still other examples, a flow control device 330 can comprise a variable damper.

Figure 4A:
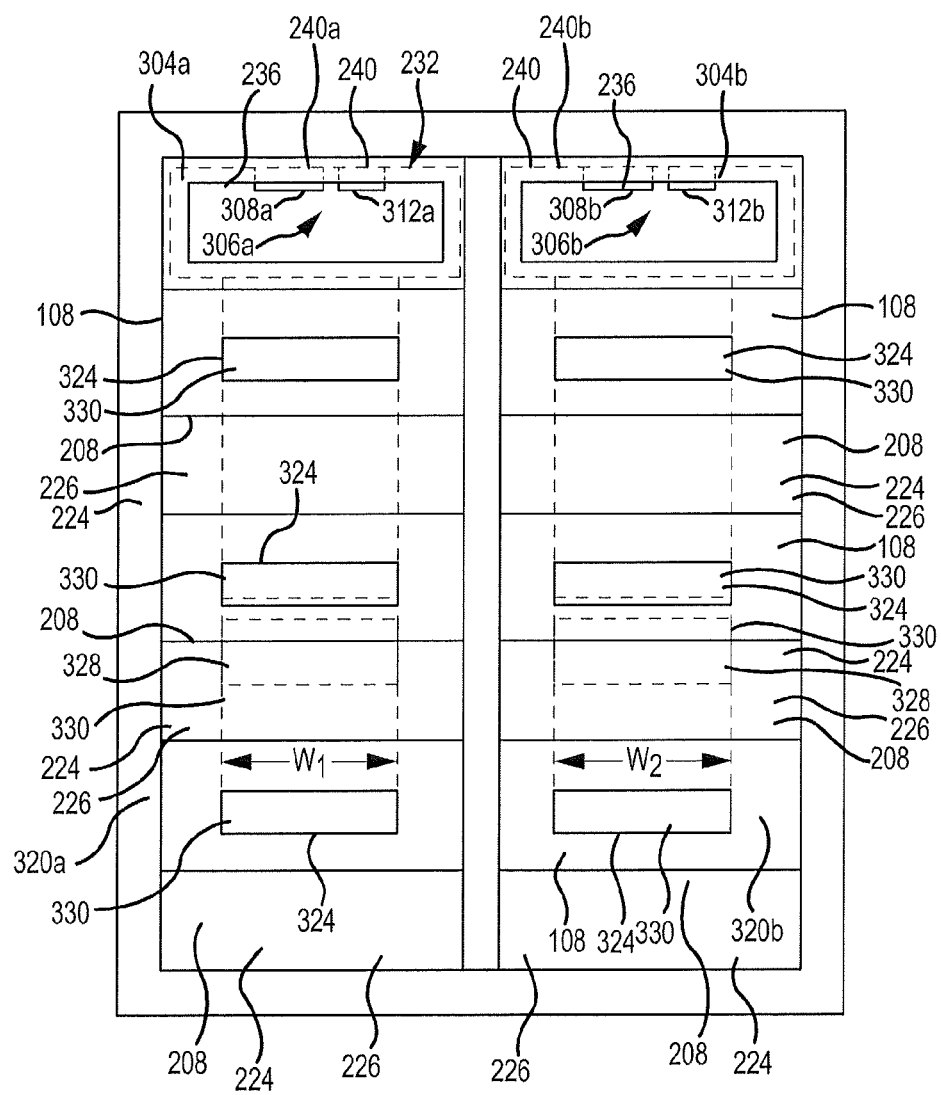
FIG. 4A is a front elevation view of portions of a multiple chamber test system depicting some of the features of an air circulation system in accordance with embodiments of the present invention.

FIG. 4A is a front elevation view of portions of an air circulation system 232 for a multiple chamber test system 100 in accordance with other embodiments of the present invention. In this exemplary embodiment, an air intake 236 is provided for each column of test chambers 108, and an air outlet 324 is provided for each of the test chambers 108. In addition, the air circulation system 232 includes first 320a and second 320b outlet plenums. More particularly, the first outlet plenum 320a is associated with a first column of test chambers 108, while the second outlet plenum 320b is associated with a second column of test chambers 108. The test system 100 can include two fans 304a and 304b and each fan 304 can supply air to one of the outlet plenums 320a and 320b. Accordingly, each outlet plenum 320a and 320b may be associated with a fan 304. The two fans 304 can draw air from a common intake plenum 240. Alternatively, the intake plenum 240 can be divided into first 240a and second 240b intake plenums. Where separate intake plenums 240a and 240b are provided, they can each house separate thermal control elements 306a and 306b, including separate heating devices 308a and 308b and/or separate cooling devices 312a and 312b. Alternatively, a common intake plenum 240 can house separate thermal control elements 306a and 306b, each of which entirely or primarily services an associated outlet plenum 320a and 320b. Moreover, the separate thermal control elements 306a and 306b can be separately controlled to provide different amounts of heating or cooling to the different columns of test chambers 108. For example, the illustrated embodiment may incorporate two tangential fans 304, with one fan 304a supplying air to the first column of test chambers 108 via the first outlet plenum 320a, and the second fan 304b supplying air to the second column of test chambers 108 via the second outlet plenum 320b. Moreover, each fan 304a and 304b can be under separate control, to provide different amounts of air to the different outlet plenums 320a and 320b. In addition, each outlet plenum 320a and 320b includes one or more flow control devices 330. For example, the area of the outlets 324 can vary with distance from the inlet plenum 240. Moreover, one or more of the flow control devices 330 can comprise variable devices. For example, the diverters 328 and/or outlets 324 can be operated to selectively vary the flow of air past or through the flow control devices 330. Where variable flow control devices 330 are provided, they may be under active control. Moreover, a flow control device 330 associated with the first outlet plenum 320a can be controlled separately from a flow control device 330 associated with the second outlet plenum 320b. The width and/or depth of the outlet plenums 320 can decrease with increasing distance from the fan 304 supplying climate controlled air to the outlet plenum 320. Alternatively, for example where diverters 328 or other flow control devices 330 are included, the depth and width of the outlet plenums 320 can remain constant.

Figure 4B:
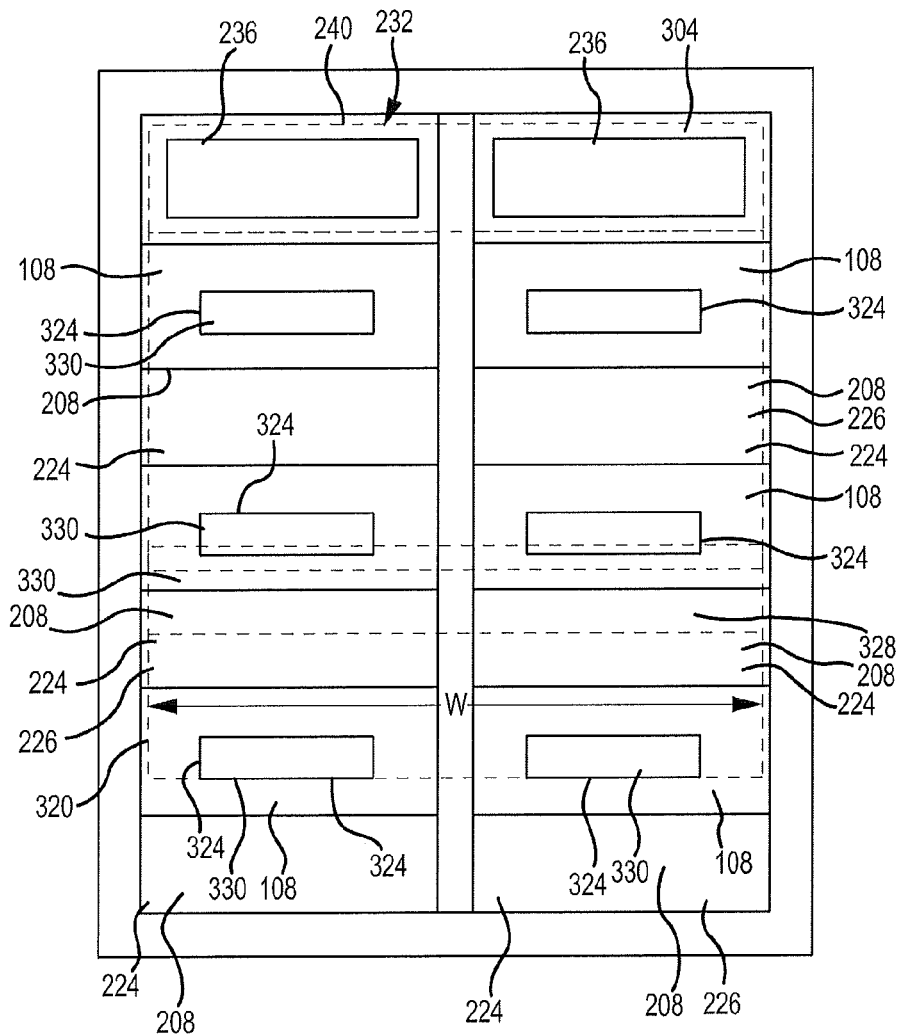
FIG. 4B is a front elevation view of portions of a multiple chamber test system depicting some of the features of an air circulation system in accordance with other embodiments of the present invention.

FIG. 4B is a front elevation view of portions of an air circulation system 232 for a multiple chamber test system 100 in accordance embodiments of the present invention. In this exemplary embodiment, an air intake 236 is provided for each column of test chambers 108. In addition, an air outlet 324 is provided for each of the test chambers 108. Accordingly, the air circulation system 232 in this embodiment includes air intakes 236 and air outlets 324 that are generally disposed in two parallel columns. In this example, the width W of the outlet plenum 320 is constant. In accordance with other embodiments, the width W may decrease as the distance from the fan 304 increases. Accordingly, whether the width W and/or the depth d of the outlet plenum decreases, the volume of the outlet plenum can decrease with increasing distance from the fan 304. Although the air intakes 236 and air outlets 324 may be arranged in parallel columns, the fan 304, the intake plenum 240, and the thermal control elements 306 within the intake plenum 240 can be common to the air circulation system 232. Accordingly, these common components of the air circulation system 232 can supply thermally controlled air to the test chambers 108 of the system 100.

As can be appreciated by one of skill in the art after consideration of the present disclosure, the arrangement of the air circulation system 232 can be varied, in order to accommodate different test chamber 108 configurations. The arrangement of intakes 236 and air outlets 324 can therefore be varied accordingly. In general, the air circulation system 232 can include at least one intake 236 for each column of test chambers 108, and at least one air outlet 324 for each test chamber 108. In addition, it should be appreciated that the air circulation system 232 need not comprise a closed loop system.

With reference now to FIGS. 5A-E, different views of a vibration table assembly 208 that may be included in a test system 100 in accordance with at least some embodiments of the present invention are illustrated. In general, the table 212 includes a first side or mounting surface 214 that may include a plurality of fixture or fastener points 216. The table 212 is supported on a second side 504, opposite the mounting surface 214, by one or more supports or table mount springs 508. The springs 508 are mounted in-board of the edges of the table 212. For example, the springs are centered on points 512 that form corners of a rectangle that is itself centered in the rectangle 514 (see FIG. 5B) defined by the mounting surface 214, and that defines an area that is equal to no more than 50% of the area of the mounting surface 214. By providing an in-board mounting location for the springs 508, the table 212 can better support a device under test as compared to a vibration table in which the springs are mounted at or close to the outer periphery of the table.

Figure 5A:
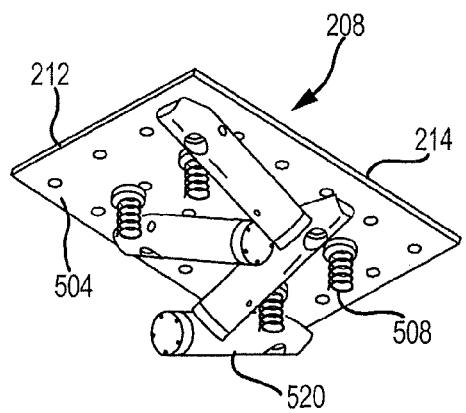
FIG. 5A is a bottom perspective view of portions of a vibration table assembly in accordance with embodiments of the present invention.
Figure 5B:
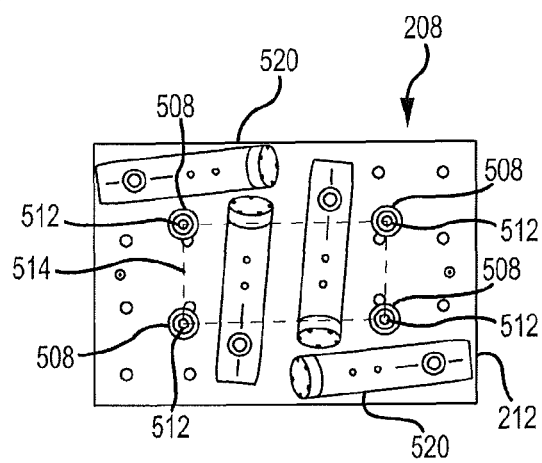
FIG. 5B is a bottom plan view of portions of a vibration table assembly in accordance with embodiments of the present invention.
Figure 5C:
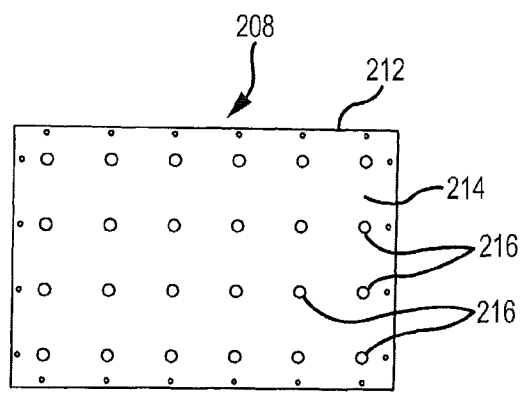
FIG. 5C is a top plan view of portions of a vibration table assembly in accordance with embodiments of the present invention.
Figure 5D:
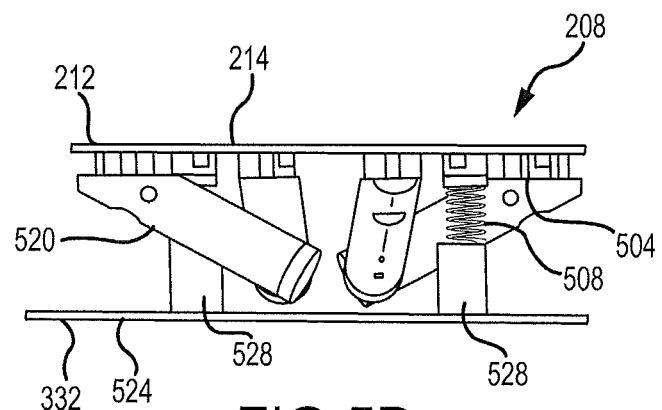
FIG. 5D is a front elevation view of portions of a vibration table assembly in accordance with embodiments of the present invention, including vibration table support elements.
Figure 5E:
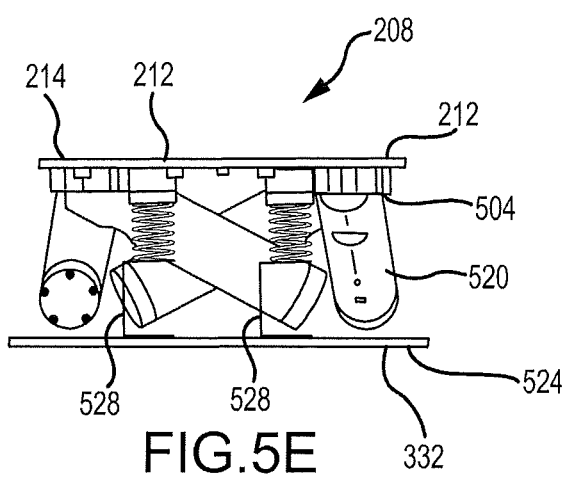
FIG. 5E is a side elevation view of portions of a vibration table assembly in accordance with embodiments of the present invention, including vibration table support elements.

In addition, a plurality of actuators or hammers 520 are interconnected to the second side 504 of the table 212. The actuators 520 can comprise any type of actuators. For example, pneumatically operated actuators, electric motor actuators, hydraulic actuators, and/or any other type of device capable of accelerating or imparting force to a table 212 can be used. In accordance with embodiments of the present invention, the actuators 520 are configured to provide movement of the table 212 in both translation and rotation with respect to the x, y and z axes. Accordingly, the vibration table assembly 208 can provide table motion having six degrees of freedom. As shown in FIGS. 5D and 5E, a vibration table support 524 can provide perches or supports 528 for the springs 508 adjacent or facing the second side 504 of the table 212. As can be appreciated by one of skill in the art after consideration of the present disclosure, the vibration table support 524 is fixed to the cabinet 104.

As previously mentioned, each vibration table 208 can be associated with a shroud 224. The shroud 224 defines an enclosed volume that contains the springs 504 that support the table 212 and the actuators 520 that impart motion to the table 212. In particular, the enclosed volume maintains a separation between the chamber air supplied by the air circulation system 232 and the air surrounding the actuators 520 and springs 508 of the vibration table. For example, where the actuators 520 comprise pneumatic hammers, the exhaust air from the actuators 520 can thus be prevented from mixing with and influencing the temperature of the chamber air. As shown in FIG. 2, the shroud 224 can include a front panel or portion 226. For a test chamber 108 that is positioned above another test chamber 108, the shroud 224 can also include a bottom panel or portion 332 (see FIG. 3). Moreover, the bottom panel or portion 332 can be a separate component, or can comprise a surface of the vibration table support 524.

Figure 6:
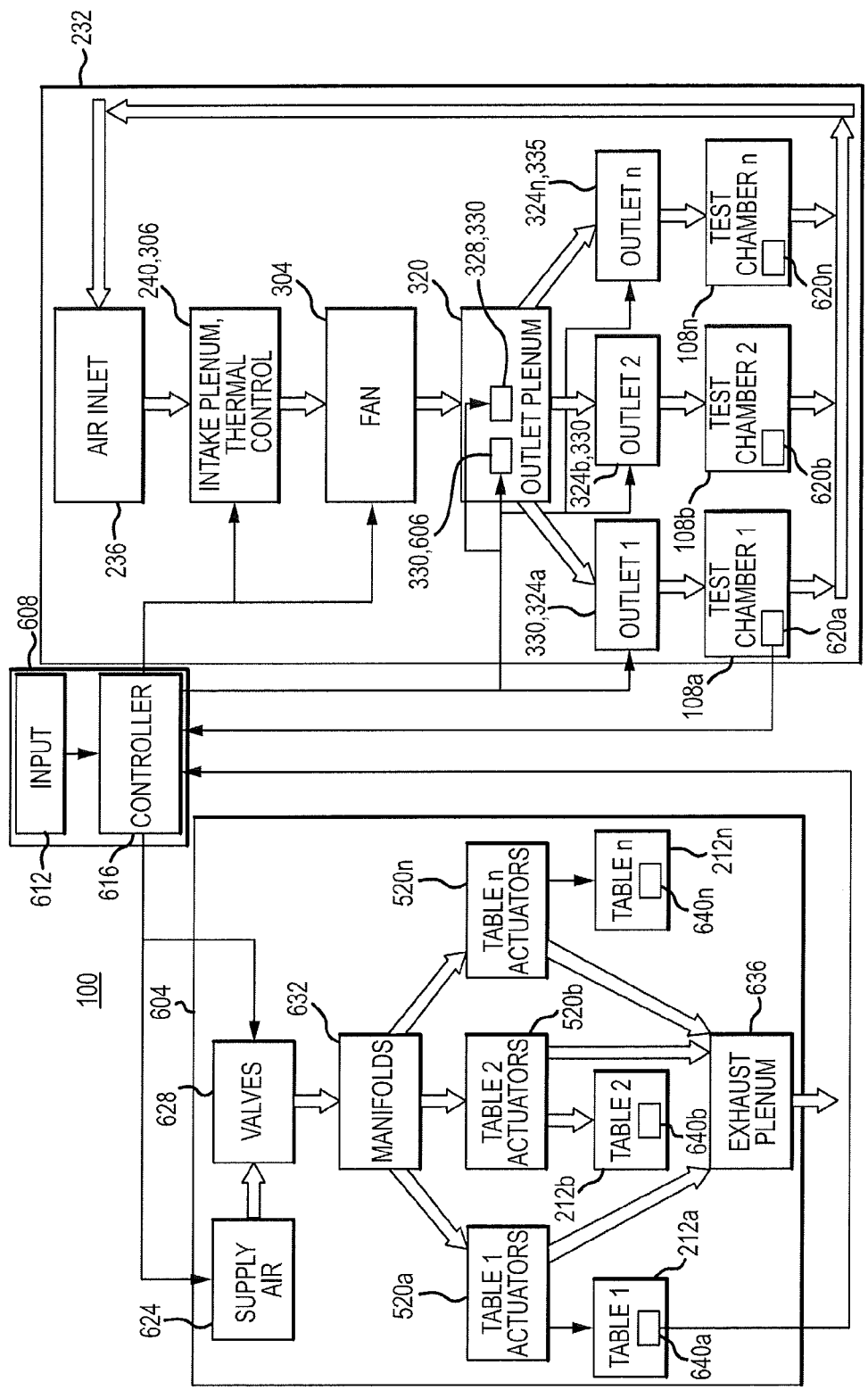
FIG. 6 is a block diagram depicting components of a multiple chamber test system in accordance with embodiments of the present invention.

FIG. 6 is a block diagram depicting components of a multiple chamber test system 100 in accordance with embodiments of the present invention. As shown in FIG. 6, the multiple chamber test system 100 includes an air circulation system 232, a vibration table actuation system 604, and a control system 608. In general, the control system 608 receives input 612 that is supplied to a controller 616 to control aspects of the operation of the multiple chamber test system 100. The input 612 can include input entered through an input device by a user. The input 612 can also include programmed control parameters. The controller 616 may comprise a general purpose programmable processor, a controller with integrated memory, or other processor or computer implemented device for executing instructions. The instructions that are executed by the controller 616 may be in the form of user input, programmed instructions stored in memory or data storage as software, and/or encoded firmware. More particularly, the controller 616 may execute a control algorithm that implements or comprises a proportional-integral-derivative (PID) control system. Moreover, a controller 616 in accordance with embodiments of the present invention can include multiple processors, memory devices, and/or logic devices. As generally described herein, the control system 608 can provide control signals to the air circulation system 232 and the vibration table system 604. In addition, the controller system 608 can receive signals from sensors associated with the air circulation system 232 and/or the vibration table actuation system 604.

Control signals provided by the control system 608 to the air circulation system 232 include signals provided to the thermal control elements 306 located in the intake plenum 240. In particular, control signals provided by the control system 608 can direct the thermal control elements 306 to heat or cool the air in the intake plenum 240. The control system 608 can also include control signals to control operation of the fan 304. In addition, the control system 608 can provide control signals to active flow control devices 330, including but not limited to variable outlets 324, variable diverters 328, or variable air dampers 606. As depicted in FIG. 6, air drawn through the air inlet 236 of the air circulation system 232 is received in the intake plenum 240, where the air can be heated or cooled at the direction of the control system 608 by the thermal control elements 306. Moreover, the air is drawn in through the air inlet 236 and the intake plenum 240, across the thermal control elements 306, by the fan 304. The heated or cooled air is then passed by the fan 304 to the outlet plenum 320. From the outlet plenum 320, the air is passed through air outlets 324 to individual test chambers 108. In the illustrated example, the outlet plenum 320 supplies air to a first outlet 324a associated with a first test chamber 108a, a second outlet 324b associated with a second test chamber 108b, and an nth outlet 324n associated with an nth test chamber 108n. Accordingly, heated or cooled air is provided to a plurality of test chambers 108. Moreover, an air circulation system 232 in accordance with embodiments of the present invention can be configured such that heated or cooled air is supplied to any number of test chambers 108. Air provided to the test chambers 108 is drawn back into the intake plenum 240 through the air inlet or inlets 236. Accordingly, the air circulation system 232 can recirculate thermally controlled test chamber air. Alternatively or in addition, the air circulation system 232 can admit air from the ambient environment, or release air to the ambient environment, to control pressure levels within the test chambers 108.

The air circulation system 232 may make use of feedback in connection with control signals provided by the control systems 608. In particular, one or more of the test chambers 108a may include a temperature sensor 620. The temperature sensor 620, which as an example can comprise a thermocouple, can send a temperature signal to the controller 616. The controller 616 can use the information regarding the temperature of the test chamber 108 provided by the temperature sensor 620 to control the thermal control elements 306, the fan 304 and/or active flow control devices 330 such that air of a desired temperature is provided to the test chambers 108. In the figure, a temperature sensor 620a, 620b, and 620n is associated with each of the first 108a, second 108b and nth 108n test chambers. Accordingly, the controller 616 can use a temperature signal provided by any one of the temperature sensors 620 to control operation of the air circulation system 232. Alternatively, an average temperature sensed by the temperature sensor 620 can be used by the controller 616. In accordance with still other embodiments of the present invention, the controller 616 can operate in response to a signal provided by any one of the temperature sensors 620. Alternatively, a temperature sensor 620 need only be provided in one of the test chambers 108, and the signal from that one temperature sensor 620 can be used to control the air circulation system 632. In accordance with still other embodiments, a temperature sensor 620 can be provided in another portion of the air circulation system 232, such as the intake plenum 240 or in an outlet plenum 320. In accordance with still other embodiments, for example where variable air outlets 324 and/or diverters 328 are included as part of the air circulation system 232, the controller 616 can operate to control those variable elements. Moreover, variable air outlets 324 and/or diverters 328 can be controlled independently by the controller 616, to provide individual control of the air temperature within the different test chambers 108. Additional sensors can also be included to provide signals used by the controller 616 in connection with control of the air circulation system 232. For example, one or more pressure sensors can be disposed within the air circulation systems 632, to provide a signal to the controller 616.

The controller 616 can also be operated to control operation of the vibration tables 208. More particularly, in the example illustrated in FIG. 6, the vibration table actuation system 604 comprises a pneumatically operated system. Accordingly, a source of supply air 624 provides operational air to a set of valves 628. For example, valves 628 may be provided for each set of actuators 520 included in the vibration table assemblies 208 having a particular orientation. Manifolds 632 then distribute the air supplied by the valves 628 to those actuators 520. As can be appreciated by one of skill in the art, operation of the actuators 520 imparts accelerations on the tables 212. The exhaust air from the actuators 520 can be collected in an exhaust plenum 636. The air from the exhaust plenum 636 may be passed to the ambient environment. In accordance with still other embodiments, individual exhaust lines may be used to vent exhaust air directly from the actuators 520 to the ambient environment.

One or more of the tables 212 may have an accelerometer 640 mounted thereto. Accordingly, as shown in the figure, each table 212 may be associated with an accelerometer 640a, 640b and 640n respectively. Signals from the accelerometer 640 can then be provided to the controller 616, and a selected one of the signals, or an average of the signals, can be used by the controller 616. In accordance with other embodiments of the present invention, only one of the tables 212 needs to be associated with an accelerometer 640.

Figure 7:
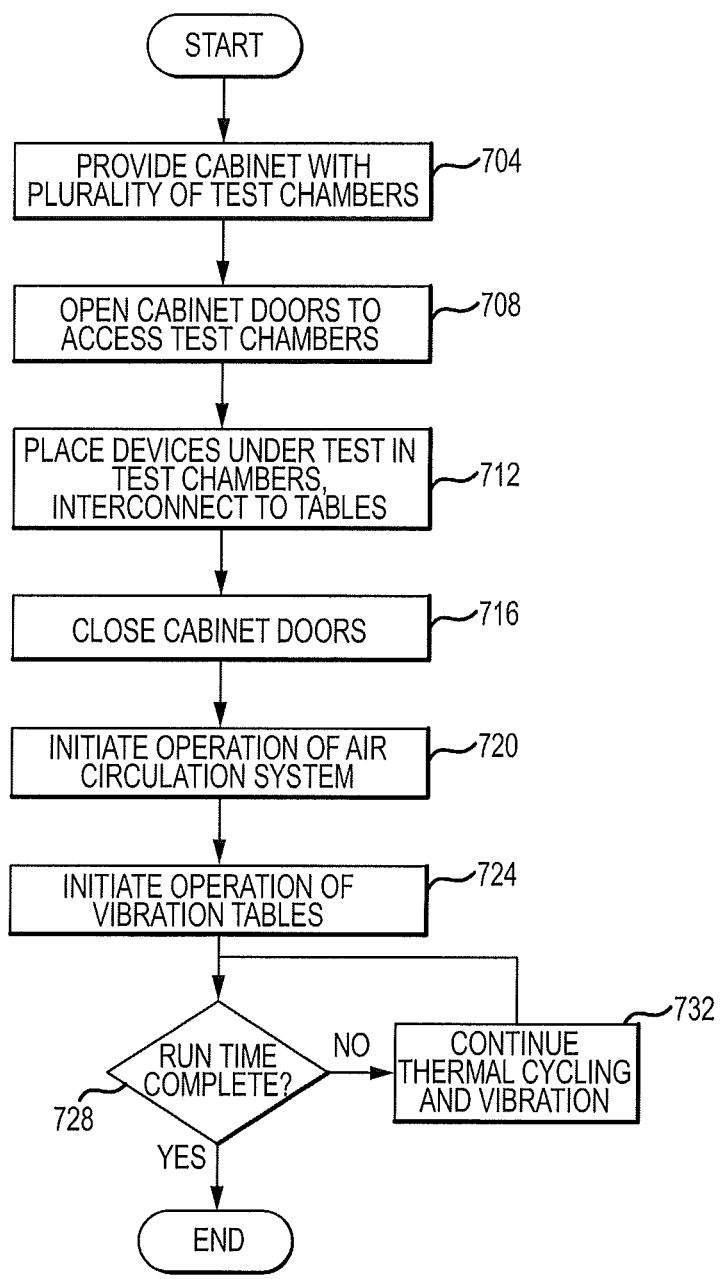
FIG. 7 is a flowchart depicting aspects of the operation of a multiple chamber test system in accordance with embodiments of the present invention.

A method for providing a test system in accordance with embodiments of the present invention is illustrated in FIG. 7. The method may be performed by or in association with the execution of a control algorithm by the controller 616. According to the method, a plurality of test chambers 108 are disposed within an enclosure 104 (step 704). Each test chamber is associated with a vibration table assembly 208. In addition, the enclosure includes an air circulation system 232 with at least one intake 236 and at least one air outlet 324 in communication with each test chamber 108. The cabinet door or doors 204 are opened to access the plurality of test chambers 108 (step 708). At least one device or product under test is then placed on and interconnected to each vibration table 208 (step 712). After the devices to be tested have each been interconnected to a vibration table 208, the cabinet door or doors 204 are closed (step 716).

Operation of the air circulation system can then be initiated (step 720). In particular, the fan or fans 304 can be turned on, to draw air in through the air inlet or inlets 236, through the intake plenum 240 and across or part the thermal control elements 306. The now heated or cooled air is then forced down the outlet plenum 320 and out the air outlets 324 into the test chambers 108. In accordance with embodiments of the present invention, forcing the air out the air outlets 324 can include diverting the air in the outlet plenum 320. More particularly, a diverter may be disposed within the outlet plenum, downstream of an air outlet 324, that forms a constriction to promote a flow of air through the air outlet 324. This use of diverters 328 allows pressures at the air outlets 324 to be equalized, to provide identical or near identical air flow and thermal conditions or stresses to devices under test in each of the test chambers 108. Alternatively or in addition, air outlets 324 and/or dampers 606 or other flow control devices 330 that can be actively controlled can be provided.

Operation of the vibration tables 208 can also be initiated after the cabinet doors 204 are closed (step 724). In accordance with embodiments of the present invention, the vibration tables 208 may accelerate an attached device, and may do so with six degrees of freedom. In accordance with further embodiments of the present invention, all of the vibration tables 208 are operated to impart the same series of accelerations to attached devices, such that identical stresses are imparted to the devices. Control of the vibration tables may be in connection with information provided by an accelerometer. The accelerometer may be attached to one of the vibration tables 208. Alternatively, more than one or even all of the vibration tables 208 may include an accelerometer.

At step 728, a determination can be made as to whether the run time for the test or burn in procedure being performed has been completed. If the run time has been completed, the process may end. Otherwise, the process will continue until the prescribed run time has been reached (step 732).

Figure 8:
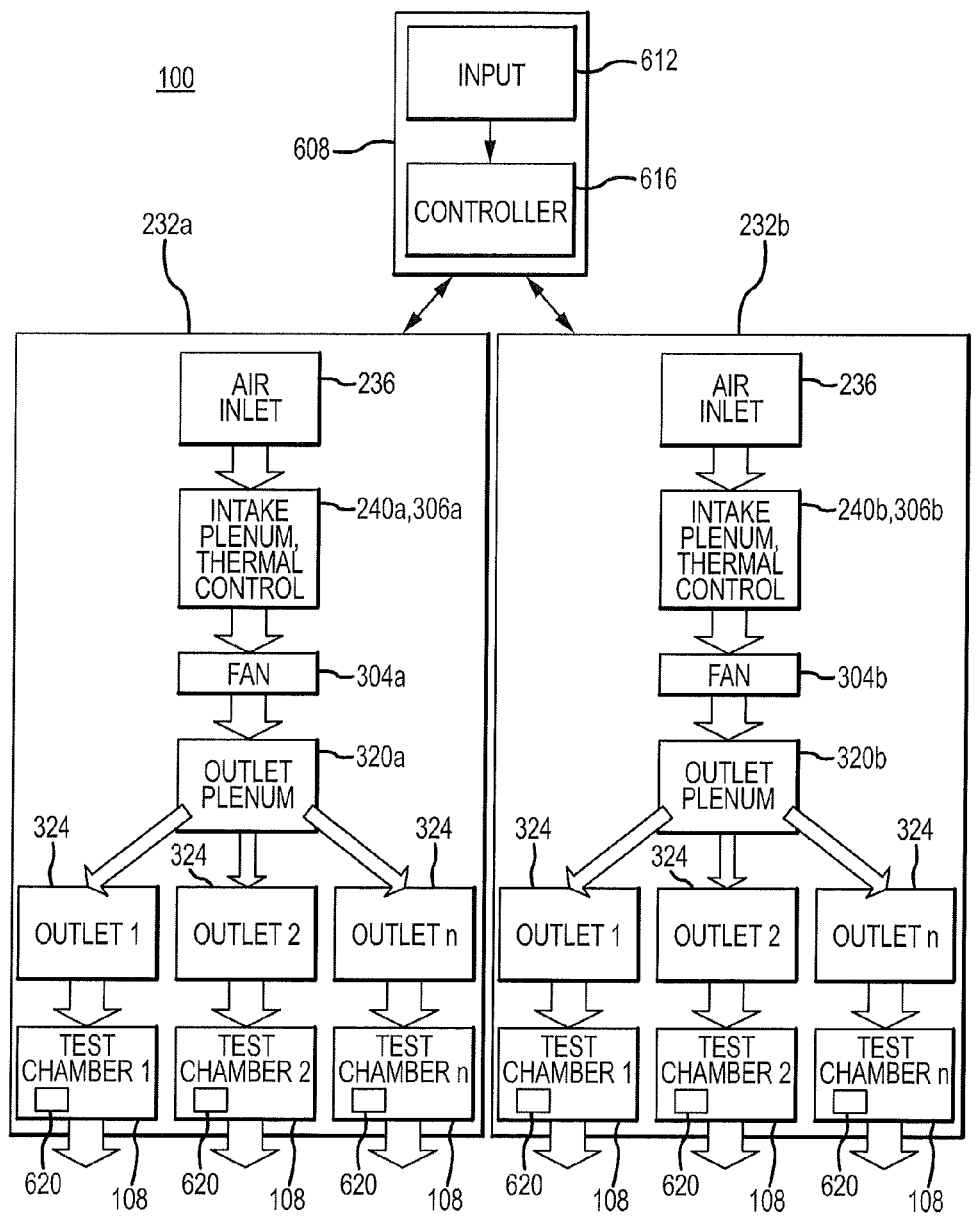
FIG. 8 is a block diagram depicting components of a multiple chamber test system in accordance with other embodiments of the present invention.

FIG. 8 is a block diagram depicting some of the components of a multiple chamber test system 100 in accordance with other embodiments of the present invention. More particularly, FIG. 8 illustrates the air circulation system 232 of an exemplary embodiment of a multiple test chamber 108 system 100 with first 232a and second 232b air circulation systems. The first air circulation system 232a may be associated with a first column of test chambers 108, while the second air circulation system 232b may be associated with a second column of test chambers 108. In this embodiment, a common control system 608 is shown. The control system 608 receives input 612 that is supplied to the controller 616. Accordingly, in certain respects, the control system 608 is similar to the control system 608 in connection with embodiments that include a single air circulation system 232. In order to separately control the multiple air circulation systems 232a and 232b in the embodiment illustrated in connection with FIG. 8, the controller 616 may implement parallel control algorithms. These parallel algorithms may be implemented by separate processors, or by a single processor implementing multiple virtual instances. In accordance with still other embodiments, the controller 616 can implement a single processor algorithm that provides separate control to the various components of the air circulation systems 232a and 232b. For instance, the algorithm executed by the controller 616 can implement a PID control system or algorithm that operates in response to temperature information provided by the temperature sensors 620a to operate the thermal control elements 306a and 306b such that differences in temperature between a first zone comprising the first column of one or more test chambers 108 and a second zone comprising the second column of one or more test chambers are reduced or eliminated. As a further example, the PID control algorithm can use temperature information from a temperature sensor 620 in the first column of test chambers 108 as a primary input, and can then add heat in pulses through the selective operation of a heating device 308 associated with the column of test chambers 108 that a comparison between the temperature sensor 620 associated with the first column and the temperature sensor 620 associated with the second column indicates has a lower temperature. Accordingly, a differential algorithm included in the main algorithm can operate the thermal control elements 306 associated with one of the columns of test chambers 108 and the associated air circulation system 232a or 232b differentially.

The provision of first 232a and second 232b air circulation systems can provide enhanced thermal control with respect to the various test chambers 108 included in the system 100. For example, the thermal control elements 306a and 306b and fans 304a and 304b can be controlled separately for each air circulation system 232a and 232b. For example, where the first air circulation system 232a is associated with a first column of test chambers 108, and the second air handling system 232b is associated with a second column of test chambers 108, temperature control of the system 100 can be by zone, with a first zone comprising the first column of test chambers 108 associated with the first air circulation system 232a and the second zone associated with the second column of test chambers 108 associated with the second air circulation system 232b. In accordance with still other embodiments, the air outlets 324 can comprise actively controlled flow control devices 330. These air outlets 324 can be individually controlled by the controller 616 to achieve and maintain a desired temperature within the individual test chambers 108 in response to temperature sensors 620 associated with those test chambers 108. Accordingly, different heat loads and/or sinks introduced by different arrangements of devices under test within the test chambers 108 can be accommodated.

Figure 9:
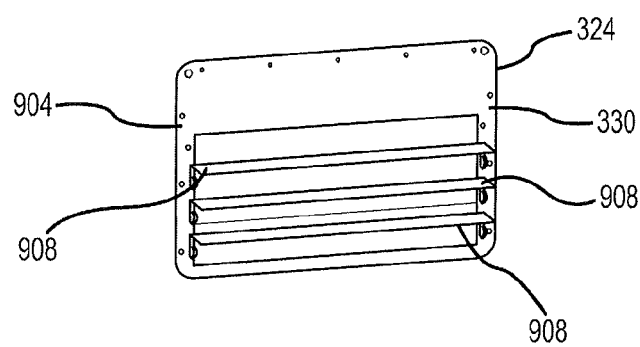
FIG. 9 illustrates an air outlet in accordance with embodiments of the present invention.
Figure 10:
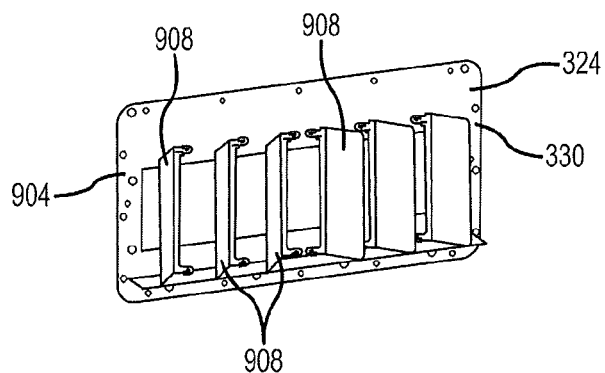
FIG. 10 illustrates an air outlet in accordance with other embodiments of the present invention.

FIGS. 9 and 10 illustrate outlets 324 of a test chamber 108 comprising active flow control devices 330 with a grill or louver assembly 904 in accordance with embodiments of the present invention. The grill assemblies 904 can include individual flow control elements or vanes 908 to direct the flow of air provided by the outlet plenum 320 to the associated test chamber 108. In particular, the embodiment illustrated in FIG. 9 incorporates vertically aligned vanes 908, to divert the air flow in a horizontal direction. FIG. 10 illustrates an air outlet 324 comprising a grill assembly 904 with vanes 908 that are arranged horizontally to control the flow of air in a vertical direction within the test chamber 108. The individual vanes 908 can be adjusted to provide an air flow that is adapted to the particular configuration, number and/or arrangement of devices under test, to provide a suitably uniform flow and/or temperature within the associated test chamber 108. This control can be manual or at the direction of the controller 616. For example, the vanes or directors 908 can be associated with motors or other control actuators operated in response to control commands provided by the controller 616.

In accordance with still other embodiments, a grill assembly 904 can include vertically, horizontally, angled or curved arranged vanes and/or restrictor plates 908. In addition to controlling the direction of flow, the vanes 908 can be used to provide different air flow amounts to different areas of the associated test chamber 108, and to control the total amount of air flow through the test chamber.

Although certain examples have depicted and described a test system 100 including an enclosure 104 housing six test chambers 108 disposed in two columns of three, embodiments of the present invention are not limited to such a configuration. In general, embodiments of the disclosed invention have application to any test system 100 incorporating a plurality of test chambers 108. In addition, although an enclosure 104 with front doors 204 only is illustrated, embodiments of the present invention can have doors configured to allow access to test chambers 108 as deemed necessary or convenient for a particular use or application. In accordance with embodiments that make use of a common controller 616, the controller 616 can operate by executing a single copy or instance of a control algorithm. Accordingly, multiple test chambers 108 can be provided with thermally controlled air, and vibration tables 212 in each of the test chambers 108 can be operated in a like manner using a single controller 616 and control algorithm. In connection with such embodiments, a temperature sensor 620 associated with any one of the test chambers 108 or any other portion of the air circulation system 232 to provide temperature information to the controller 616. A single accelerometer 640 associated with any one of the tables 212 can be used to provide the controller 616 with acceleration information. In accordance with such embodiments, it is advantageous that the test chambers 108, vibration table assemblies 208 and attached devices under test be configured identically. Although various examples provided herein discuss the use of pneumatic actuators 520, any type of actuator may be used.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A test system, comprising:
    a plurality of test chambers disposed within a test cabinet;
    an air circulation system, including:
        a fan that draws air through an air intake and provides the air to an outlet plenum;
        a plurality of air outlets, each of the air outlets delivering a portion of the air from the outlet plenum to a corresponding one of the test chambers; and
    a plurality of vibration tables, wherein each of the test chambers includes at least one of the vibration tables.

2. The system of claim 1, further comprising:
    a vibration table shroud, wherein at least one of the vibration tables is associated with the vibration table shroud.

3. The system of claim 2, wherein the at least one of the vibration tables associated with the vibration table shroud is disposed above another of the vibration tables.

4. The system of claim 2, further comprising:
    a plurality of vibration table actuators, each of the vibration tables being associated with one or more of the vibration table actuators, and wherein the vibration table shroud separates an air space surrounding the vibration table actuators associated with that vibration table, from the air delivered by the air circulation system to the test chamber that includes that vibration table.

5. The system of claim 3, wherein the at least one of the vibration tables that is associated with the vibration table shroud, and is disposed above another vibration table, includes a front panel and a bottom panel.

6. The system of claim 2, wherein all of the vibration tables are associated with a vibration table shroud, wherein at least one vibration table shroud associated with a vibration table at a bottom of a column of vibration tables includes a front panel, and wherein at least one vibration table shroud associated with a vibration table disposed above another vibration table includes a front panel and a bottom panel.

7. The system of claim 1, further comprising:
    at least one diverter, wherein the at least one diverter is disposed inside the outlet plenum, and wherein the at least one diverter forms a constricted area within the outlet plenum.

8. The system of claim 7, wherein the at least one diverter is downstream of at least one of the air outlets.

9. The system of claim 8, wherein the at least one diverter is upstream of another one of the air outlets.

10. The system of claim 1, further comprising at least a first flow control device.

11. The system of claim 10, wherein the at least a first flow control device comprises one of a diverter, a damper, a valve, a grill, a louver, and an outlet.

12. The system of claim 10, wherein the flow control device is an active flow control device.

13. The system of claim 1, wherein the fan is a tangential fan.

14. The system of claim 1, further comprising:
    a thermal control element, wherein the thermal control element is disposed within the intake plenum.

15. A multiple chamber test system, comprising:
    a cabinet;
    a plurality of test chambers disposed within the cabinet and accessible through at least one door of the cabinet;
    a plurality of vibration tables, each test chamber including at least one of the vibration tables; and
    an air circulation system, including at least a fan and a plurality of air outlets, wherein each test chamber in the plurality of test chambers is associated with at least one of the air outlets.

16. The system of claim 15, wherein the plurality of test chambers are arranged to form at least one column of test chambers within the cabinet, wherein a vibration table shroud is associated with each test chamber that is above any other test chamber.

17. The system of claim 15, further comprising:
    at least one vibration table shroud, wherein at least one test chamber in the plurality of test chambers is associated with a vibration table shroud.

18. A method for providing airflow through a multi-chambered environmental test system, comprising:
    drawing air into an air circulation system of the test system, through an intake that is in communication with a plurality of test chambers of the test system;
    forcing the air through an air outlet plenum, wherein the air outlet plenum includes a plurality of air outlets in series, and wherein each test chamber in the plurality of test chambers is associated with one of the air outlets; and
    selectively diverting air from the air outlet plenum through each of the air outlets to provide an equal amount of the air to each of the test chambers.

19. The method of claim 18, wherein each test chamber includes a vibration table, the method further comprising:
    interconnecting a device under test to each vibration table;
    using the air circulation system, circulating air at a controlled temperature through the plurality of test chambers;
    operating the vibration tables, wherein the vibration tables are moved using pneumatic actuators, and wherein exhaust air from the pneumatic actuators is segregated from the air circulated through the air circulation system.

20. The method of claim 19, wherein a temperature within each of the test chambers is about the same at any one point in time.

* * * * *